F. C. SIMON & J. F. O'BRIEN.
BOX TOPPING AND TAPING MACHINE.
APPLICATION FILED NOV. 1, 1915.

1,204,079.

Patented Nov. 7, 1916.
6 SHEETS—SHEET 5.

UNITED STATES PATENT OFFICE.

FORREST C. SIMON AND JOHN F. O'BRIEN, OF PIQUA, OHIO, ASSIGNORS TO THE PIQUA MACHINE AND BOILER CO., OF PIQUA, OHIO.

BOX TOPPING AND TAPING MACHINE.

1,204,079.   Specification of Letters Patent.   Patented Nov. 7, 1916.

Application filed November 1, 1915. Serial No. 58,979.

*To all whom it may concern:*

Be it known that we, FORREST C. SIMON and JOHN F. O'BRIEN, citizens of the United States, residing at Piqua, in the county of Miami and State of Ohio, have invented certain new and useful Improvements in Box Topping and Taping Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for topping and taping boxes.

The object of the invention is to provide a machine for topping and applying tape to boxes, such as those used in millinery stores and elsewhere, having a high degree of efficiency in handling boxes and which is comparatively devoid of complicated mechanism, as will hereinafter more fully appear from the description to follow.

In the brief reference to the accompanying drawings.

In a detail description of the machine, similar reference characters indicate corresponding parts throughout the various views of the drawings and the description in connection therewith.

Figure 1:
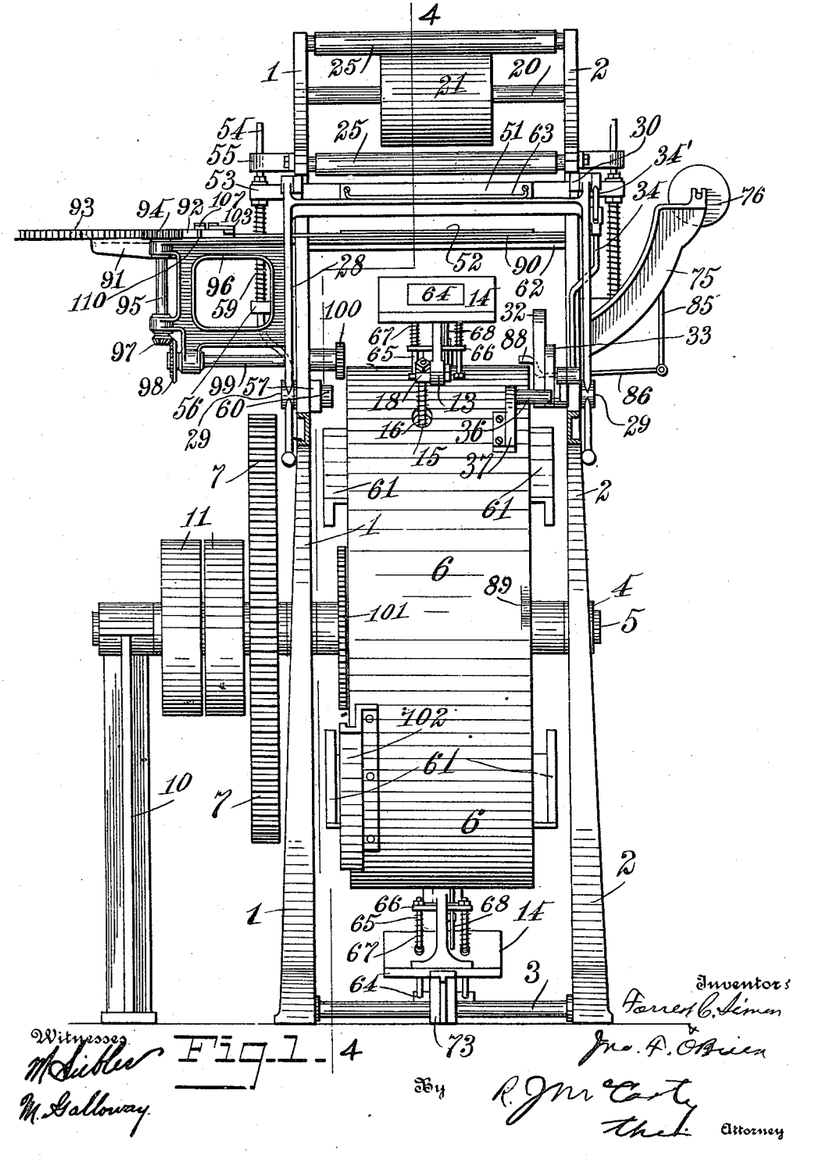
Figure 1 is a front elevation of our improved machine.

Referring more particularly to the drawings and viewing the machine from Fig. 1, 1 designates a left side frame and 2 a right side frame connected by a suitable number of tie-rods 3. A shaft 5 is journaled in suitable bearings 4 in said side frames and upon this shaft is rigidly mounted a drum or broad-faced wheel 6. Also mounted on the shaft 5 is a gear wheel 7 in mesh with a pinion 8 (Fig. 2) mounted on a shaft 9, said shaft being journaled in bearings on the frame 1 and standard 10. The shaft 9 is provided with tight and loose pulleys 11 through which the machine is driven from any well known source of power. Pivoted at 12 (Fig. 4) to the drum 6 are frames 13 having box forms 14 upon which the boxes to be topped and applied with tape are placed. In the drawings, we have shown two such frames 13 but a greater number may be mounted on the drum according to the diameter of said drum. The forms 14 are removable and are of a size adapted to receive the boxes which are slipped over said forms. The free ends of the frames 13 are pressed outwardly by springs 15 mounted on rods 16 pivoted at 17 to adjacent spokes of the drum 6. The rods 16 also pass through lugs 18 on the frames 13 and are fitted with nuts 19 and thereby said frames 13 and the forms 14 are held in normal position against the tension of said springs 15. The boxes to be operated upon are placed upon the forms 14 and when said forms are in a position somewhat below that occupied by the upper form shown in Fig. 4.

Figure 2:
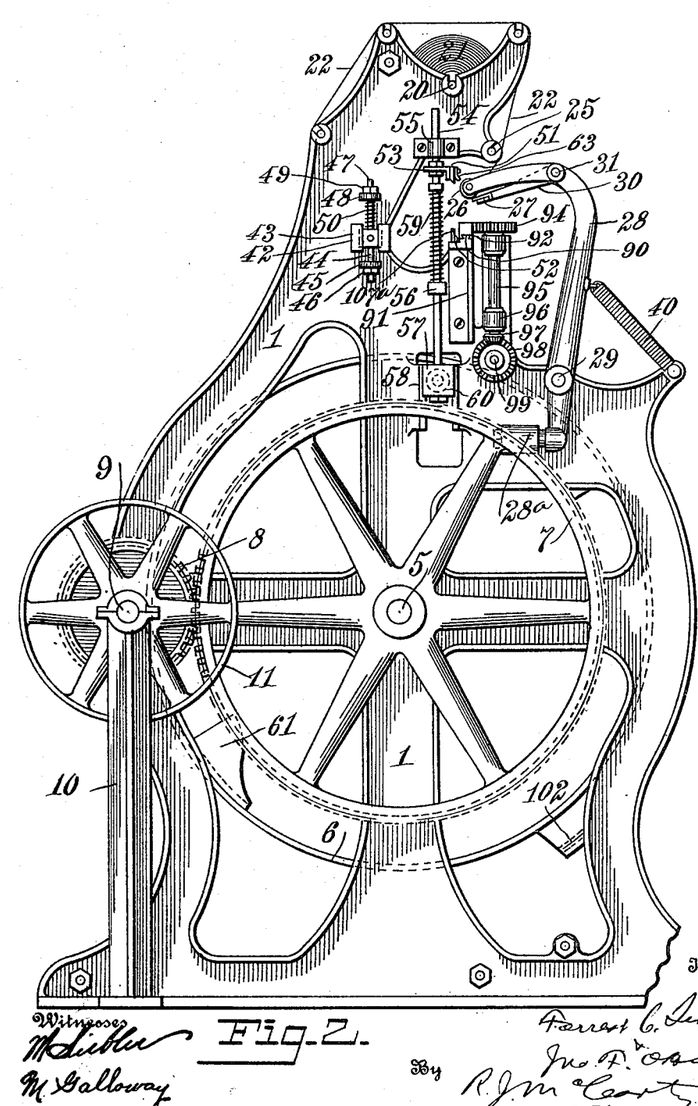
Fig. 2 is a side elevation of the machine.
Figure 3:
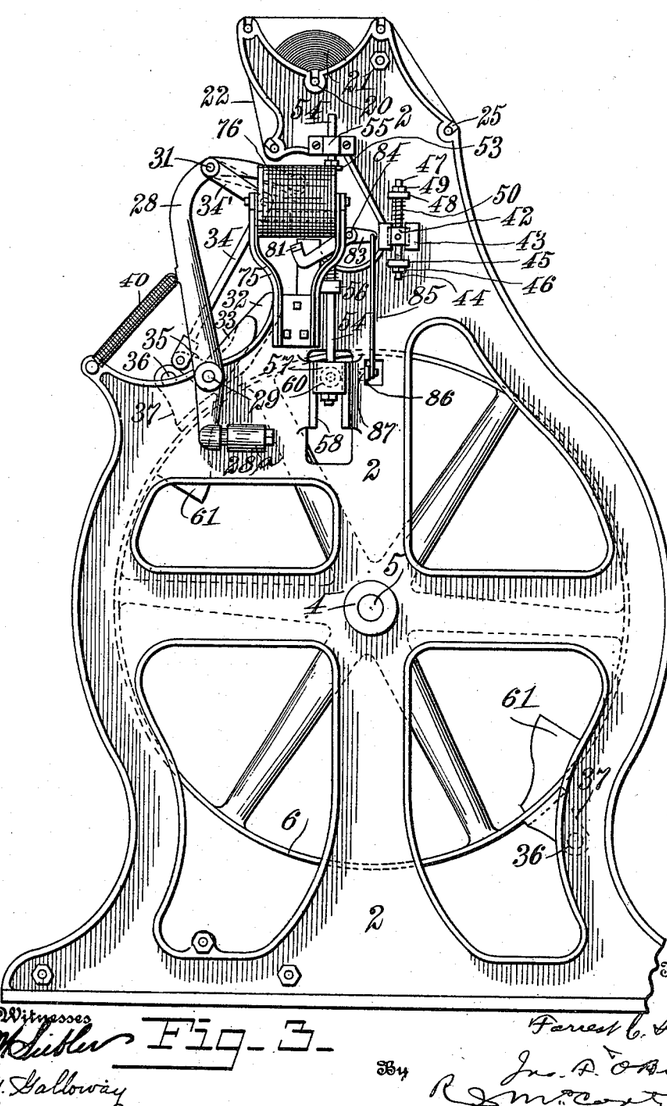
Fig. 3 is a similar elevation of the side opposite that shown in Fig. 2.
Figure 8:
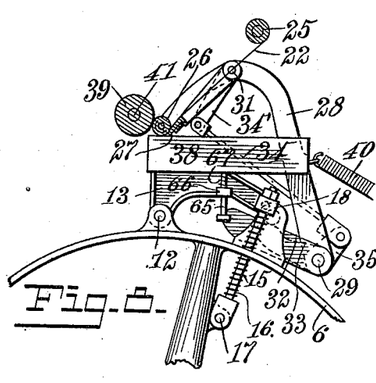
Fig. 8 is an enlarged view of the paper feeding and applying devices in the other extreme position of its movement as compared with the same mechanism as shown in Fig. 4.
Figures 9, 10:
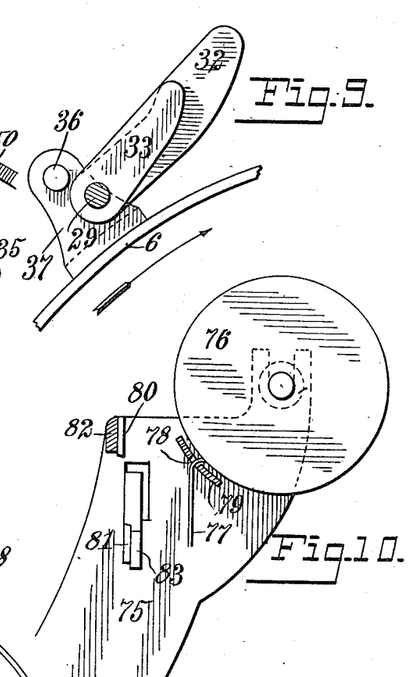
Fig. 9 is a detail view of the cams which are included in the paper-applying devices.
Fig. 10 is a detail view of the tape-roll and the cutting blades.

When a form with a box thereon reaches an upper position, the box is "topped" by pasting a strip of paper thereon. Before this is done, however, the tape is applied by means presently described. The "topping" of the box is done by the following means: A shaft 20 mounted in the side frames 1 and 2 supports a roll of paper 21 from which a web 22 unwinds. The said web 22 passes over a gluing roll 23 which receives glue from a trough 24 and thence over a series of guide rollers 25 mounted in the side frames and the end thereof passes between a roller 26 and a clamping blade 27. The said roller 26 is mounted in a frame formed by overhanging arms 28 pivoted at 29 to the side frames 1 and 2, while the clamping blade 27 is mounted on arms 30 pivoted at 31 to the overhanging arms 28. A cam 32 is rigidly mounted on one of the pivots 29 of the arms 28 upon which is also freely mounted a cam 33 (Fig. 9). The cam 32 is, therefore, rigidly connected with the arms 28, while the cam 33 is connected to the arms 30 which carry the blade 27 by a connecting rod 34, crank 34' and a crank 35. The cams 32 and 33 are adapted to be engaged by pins 36 carried by brackets 37 mounted on the drum 6. When one of the pins 36 initially engages the cam 33, the web 22 is clamped between the roller 26 and the blade 27. During the extended movement of the said pin 36, the cam 32 is engaged thereby and the arms 28 are in turn actuated to depress the roller 26 and the blade 27 thus drawing out the web 22. When the roller 26 reaches a lowermost position, the end of the box on the form 14 is in a position to properly receive the extreme free end of the web 22. This operation is shown in Fig. 8 where it will be seen that the roller 26 is instrumental in initially pressing the web upon a box 38. The continuous movement of the form 14 carrying the box 38 will bring said box under a pressure roller 39, meanwhile drawing out a length of paper sufficient to cover the top of the box. The roller 39 presses the strip of glued paper upon the box. As the box moves forward, the pin 36 releases the cams 33 and 32 and allows springs 40 to move the arms 28 to a normal position where they are held by bumpers 28ᵃ (Figs. 2 and 3). The roller 39 is provided with spindles 41 which are mounted in blocks 42 (Figs. 5 and 6) which in turn are mounted in guides 43 in the side frames 1 and 2. The blocks 42 are adapted to receive the upper ends of pins 44 mounted in lugs 45 and provided with jam-nuts 46, the pins 44 being instrumental in adjusting the position of the roller 39. The guides 43 permit the roller 39 to have a slight vertical movement to compensate for any inequalities of the forms 14. The upward movement of the blocks 42 is limited by screw-bolts 47 mounted in lugs 48 and provided with jam-nuts 49. The roller 39 is pressed downwardly by springs 50 surrounding the screw-bolts 47. The rear end of the forms 14 when passing under the roller 39 recedes on the pivot 12 against the tension of the springs 15 and when said roller releases the forms 14 the said springs 15 will return said forms to the normal position.

Figure 4:
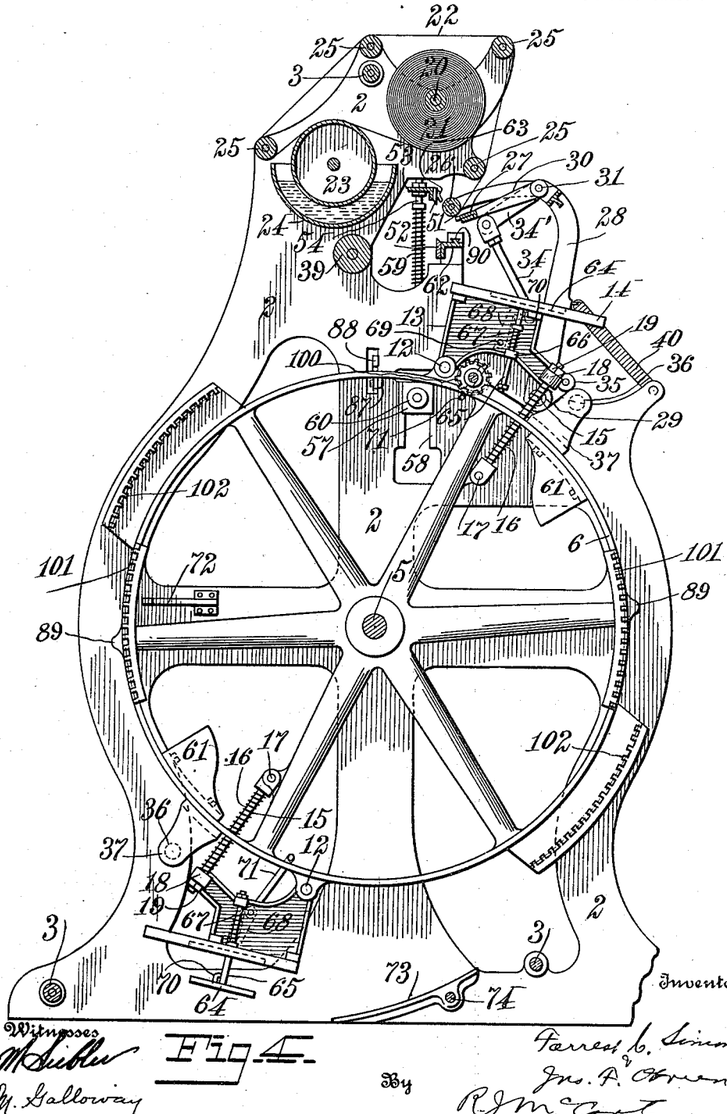
Fig. 4 is a vertical section approximately on the line 4—4 of Fig. 1.
Figure 12:
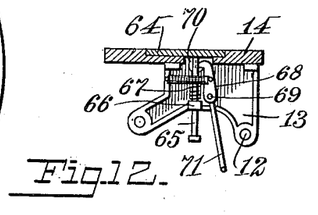
Fig. 12 is a detail view of the latch which controls the box knock-off device as shown in Figs. 4 and 8.

When the end of the paper web has been attached to the box and a sufficient length of paper to form a top has been drawn out, the paper is severed by knives 51 and 52 (Figs. 1 and 4). The knife 51 is mounted upon an angle cross-bar 53 which in turn is mounted on rods 54 on the outside of the side frames 1 and 2. The rods 54 are mounted in guides 55 and 56 and the lower ends of said rods are attached to blocks 57 slidably mounted in guides 58 in the side frames 1 and 2. The knife 51 is moved upwardly by springs 59 which surround the rods 54. The blocks 57 are provided with rollers 60 adapted to be engaged by cams 61 carried by the drum 6, the cams 61 being so placed upon the drum as to cut off the paper at a proper length and at the proper time. The lower knife 52 is mounted upon a cross-bar 62 mounted on the side frames 1 and 2. The upper knife 51 is provided with a guard-rod 63 which is instrumental in holding the paper in a proper position when being severed by the knives. The cutting operation takes place before the rear end of the forms 14 clear the roller 39 and after the arms 28 have been returned to the normal position by the springs 40. After the forms 14 clear the roller 39, the box is pushed off the forms 14 by plates 64 which are mounted in suitable recesses in the forms 14 (Figs. 1 and 4). The said plates 64 are supported on rods 65 journaled in guides 66 extending from the frames 13. The said rods 65 are further provided with springs 67 which are adapted to move the plates 64 outwardly to dislodge the boxes from the forms. The said plates 64 are held in their depressed or inner positions by latches 68 pivoted at 69 to the frames 13 (Fig. 12). The said latches 68 are adapted to engage hooks or projections 70 on the under side of the plates 64 to hold said plates in such positions. The said latches 68 are provided with extensions 71 adapted to engage a projection 72 extending from the inner side of the frame 2 (Fig. 4). When the projection 72 engages one of the extensions 71, a respective latch 68 will release its plate 64 thereby enabling springs 67 to knock the box from the forms 14. The knock-off plates 64 are returned to their normal positions by a cam 73 mounted on a cross-rod 74 at the bottom of the machine.

As hereinbefore stated, the machine is adapted to place tape upon the box to be utilized in tying the cover on the boxes, etc., This tape is covered by the paper strip, the application of which has just been described, by the following means:—Extending from the side frame 2 (Figs. 1 and 3) is a frame 75 which supports a tape spool 76. The tape 77 thereon (Fig. 10) is unwound from the spool and passed through an orifice 78 in a plate 79 mounted in said frame 75. The said orifice 78 holds the tape 77 opposite a stationary knife 80 and a movable knife 81. The knife 80 is mounted upon a cross-bar 82 on the frame 75, while the knife 81 is mounted upon a lever 83 pivoted at 84 to said frame. (Figs. 3 and 10). Pivotally attached to the lever 83 is a connecting rod 85 which is also attached to a lever 86 pivoted at 87 to the side frame 2. The free end 88 of the lever 86 is adapted to be engaged by cams 89 mounted upon the drums 6 (Fig. 1). When one of said cams 89 engages the end 88 of the lever 86, the lever 83 will be actuated to sever the tape 77 and the severed portion of the tape will drop upon the box.

Figures 5, 6, 7:
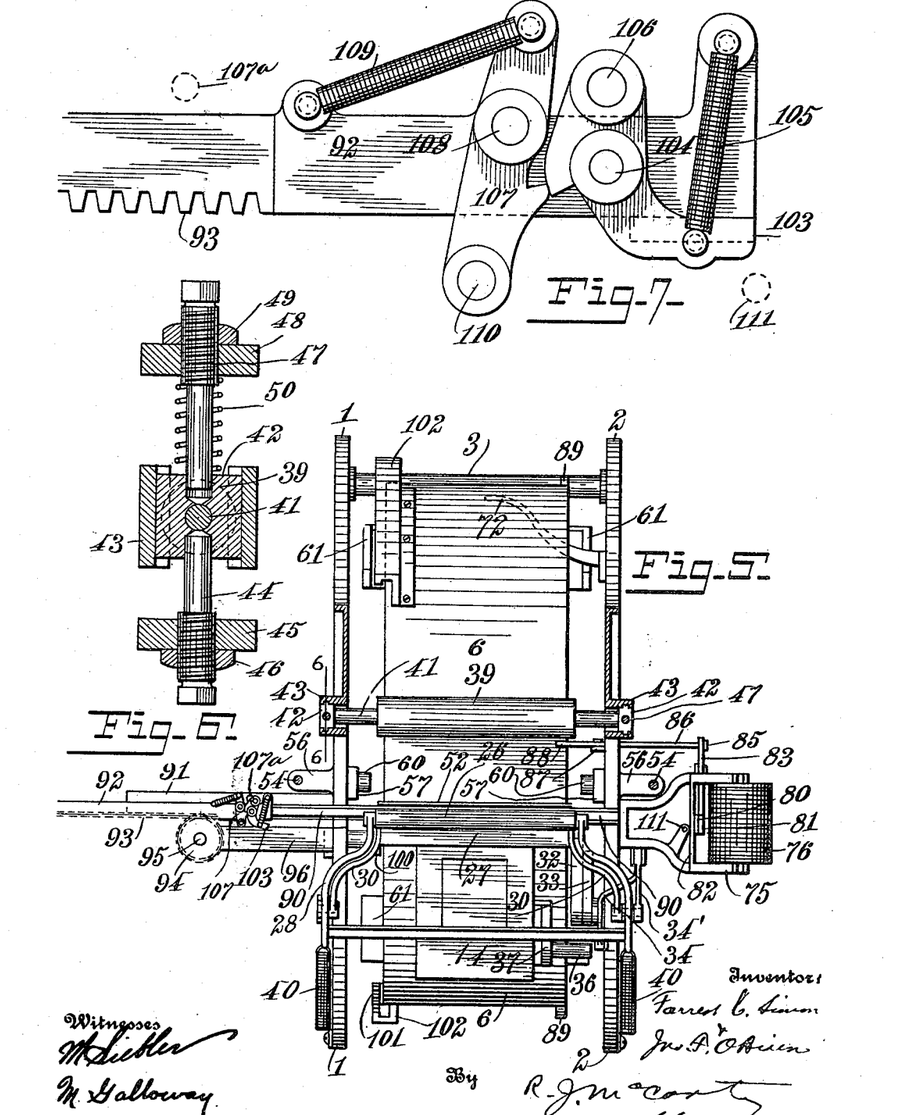
Fig. 5 is a top plan view of the machine with the gluing and paper rolls removed and part of the frame shown in section.
Fig. 6 is an enlarged section on the line 6—6 of Fig. 5.
Fig. 7 is an enlarged detail view of the tape-gripping devices.

The tape 77 is held between the knives when being severed by the following means (Figs. 1, 4 and 5): A dovetail guide 90 is mounted upon the cross-bar 62 which supports the stationary knife 52. The said guide 90 extends to the left, as seen in Fig. 1, and the extended end thereof is supported by a bracket 91. A bar 92 provided with a rack 93 is adapted to slide upon the guide 90. Meshing with the rack 93 is a pinion 94 mounted upon a vertical shaft 95 journaled in a frame 96 on the outside of the side frame 1. The lower end of the shaft 95 is provided with a bevel gear 97 in mesh with a bevel gear 98 upon a horizontal shaft 99 journaled in the frames 1 and 96. The inner end of said shaft 99 is provided with a pinion 100 adapted to mesh with external segment gears 101 and internal segment gears 102. There are two sets of segment gears to correspond with the two forms 14 and said segment gears are mounted upon the drum 6. The segment gears 101 are adapted to rotate the pinion 100 in a direction to move the bar 92 in a direction toward the tape 77, while the segment gears 102 are adapted to move said bar in an opposite direction to draw out the tape. The bar 92 is provided with a tape-clamping device which consists of a dog or lever 103 (Figs. 5 and 7) pivoted at 104 and normally under the influence of a spring 105 which is adapted to move said lever 103 in a direction to clamp the tape between the lever and the end of the bar. The lever 103 is further provided with a pin 106 adapted to engage a pin 107ª on the bracket 91 to move the lever 103 to an open position against the tension of the spring 105. The said lever is held in this open position by a dog or latch 107 pivoted at 108 to the bar 92 and normally under the influence of a spring 109. The latch 107 is provided with a pin 110 adapted to engage a pin 111 mounted on the tape spool frame 75 (Fig. 5). When the pin 110 engages the pin 111, the latch 107 is released from engagement with the lever 103 thereby permitting said lever to grasp the tape 77 as it hangs from the orifice 78, as will be seen from Fig. 10. The position of the pin 111 is such that the lever 103 will grasp the tape 77 when the bar 92 reaches the end of its movement to the right, as seen from Fig. 5. After the lever 103 has grasped the tape, the bar 92 is moved to the left thereby drawing out the tape. When the bar 92 reaches the limit of its movement to the left and has drawn out a sufficient length of tape, the pin 106 engages the pin 107ª thereby allowing the lever 103 to release the the tape. Simultaneous with this movement, the tape is severed by the knives 80 and 81 which permits the severed piece to fall. The parts are so timed and located that the tape will fall in a proper position on each box as the same are held on the forms 14. The tape will be united to the box by the strip of paper which is subsequently pasted thereon, as hereinbefore described.

Figure 11:
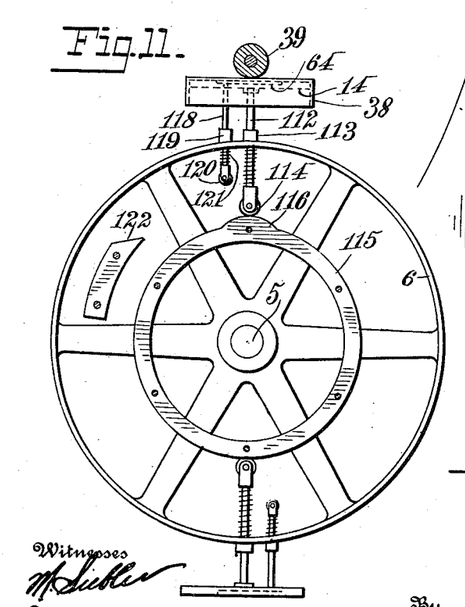
Fig. 11 is a modification of the means for knocking the boxes from the forms or holders after being topped or applied with paper and tape.

In Fig. 11, we show a modified construction of the means for carrying and controlling the forms 14. In Fig. 4, it will be observed, the said forms 14 are normally under the influence of the springs 15 when passing under the roller 39, while in Fig. 11 the movement of the forms is controlled positively. In Fig. 11 the forms 14 are suitably mounted upon radially sliding rods 112 mounted in bearings 113 in the periphery of the drum 6. The inner ends of the rods 112 are provided with rollers 114 which run on a stationary ring 115, said ring being mounted upon a convenient part of the frame. The forms 14 are moved inwardly and the rollers 114 are maintained in engagement with the periphery of the ring 115 by springs 117 which surround the rods 112. When passing under the roller 39, the rollers 114 engage a cam 116 on the ring 115. The shape of the cam 116 is such that the point of the forms 14 in engagement with the roller 39 will at all times be equi-distant from the center of the drum 6, thereby permitting the roller 39 to remain stationary with reference to its vertical movement. In this connection the knock-off plate 64 is mounted upon radially movable rods 118 which in turn are mounted in guides 119 on the drum 6. The inner ends of the rods 118 are provided with rollers 120 and the plates 64 are maintained in a normal position by springs 121 surrounding the rods 118. After the forms 14 pass under the roller 39, the plates 64 are actuated to knock off the box by a stationary cam 122 conveniently mounted and adapted to engage the rollers 120 thus moving the plates 64 against the tension of the springs 121.

Other modifications may be made without departing from the underlying principles of our invention as set forth in the foregoing description and as embodied in the claims.

Having described the invention both in its construction and operation, we claim.

1. In a machine of the character specified, a rotatable member carrying a series of pivotally supported box forms, means for applying tape to the boxes supported on said forms, and means for applying paper to said boxes over the tape and comprising paper feeding devices, and means for applying an adhesive to the surface of said paper in advance of its application to the boxes.

2. In a machine of the character specified, a rotary member, a series of frames pivoted thereto and supporting a series of box forms, paper unwinding devices, an adhesive-applying roller over which said paper is conducted by said unwinding devices, and means for cutting said paper into definite lengths during its application to the boxes.

3. In a machine of the type specified, a rotatable member carrying pivotal box forms, gripping means comprising angular levers adapted to engage a web of paper and apply it to said boxes as the same are advanced, means carried on said rotatable member adapted to open and close said gripping means, a pressure roller adapted to engage said paper as the boxes are carried forward and to apply the same to said boxes, and means for dislodging said boxes from said forms at the completion of each application of paper.

4. In a machine of the character specified, a rotatable member carrying box forms which are pivotally supported thereon, paper feeding devices adapted to apply paper to said boxes, means for operating said paper feeding devices including cams mounted upon said form-carrying member, means for cutting said paper in required lengths for each box, means for dislodging each box from said forms at the completion of each application of paper thereto, said box-dislodging means including spring-controlled members, and means for holding said box dislodging means and for releasing the same to permit of the dislodgment of the boxes.

5. In a machine of the character specified, a rotatable member carrying a series of box forms, tape-applying means including grippers to fit the tape and means for cutting each length of tape, means for applying paper to the boxes over said tape and including arms and grippers supported on said arms, means carried by said rotatable member for actuating said arms and said grippers to grip the paper and to feed it forward, and kickers adapted to remove each box from its supporting form at the completion of each paper-applying operation.

6. In a machine of the character specified, a rotatable member carrying a series of box forms pivotally mounted thereon, means for maintaining said box forms in a position for the application of boxes, box-ejecting means mounted on said box forms, means for applying paper to the boxes when supported on said forms including a frame and grippers mounted thereon, a cam carried on said rotatable member adapted to actuate said grippers to grip the paper in advance of a forward movement of said frame, means for imparting such movement to said frame when the grippers hold said paper, an adhesive-applying device for applying adhesive substance to the paper, a pressure roller engaging the paper applied to the boxes, and means for cutting the paper at the completion of the operation of said pressure roller thereon.

7. In a machine of the character specified, a rotatable member carrying a series of pivotal box forms, means for holding said box forms in a position to receive the paper, means for gripping the paper and advancing the same, a pressure roller adapted to engage said paper when it is advanced by said grippers and to apply the paper to the boxes, a cutting device to sever said paper upon the completion of each application thereof by said roller, and means for kicking the boxes from said forms at the completion of each paper application.

8. In a machine of the character specified, a box-carrying member, means for drawing tape across boxes carried by said member, means for releasing said tape, means for simultaneously severing said tape, said tape-drawing means being actuated by said box carrying member.

9. In a machine of the character specified, a box carrying member, means for drawing tape across boxes carried thereon, means for releasing said tape, means for simultaneously severing said tape, said severing means being actuated by said box-carrying member.

10. In a machine of the character specified, a box-carrying member, means for drawing tape across boxes carried thereon, means for releasing said tape, means for simultaneously severing said tape, said tape-drawing means and said severing means being actuated by said box-carrying member.

11. In a machine of the character specified, a box-carrying member, a rack movable across said member and actuated thereby, tape-clamping means mounted on said rack, tape-severing means actuated by said box-carrying member, and means for releasing said clamping means.

12. In a machine of the character specified, a box-carrying member, a rack movable across boxes carried thereon, internal and external gears mounted on said box-carrying member and adapted to actuate said rack, clamping means carried by said rack, severing means actuated by said box-carrying member, and means for releasing said clamping means.

13. In a machine of the character specified, a box-carrying member, a rack movable across boxes carried thereon, internal and external gears mounted on said box-carrying member and adapted to actuate said rack, tape-clamping means mounted on said rack, tape-severing means, a cam on said box-carrying member adapted to actuate said severing means, and means for releasing said tape-severing means.

14. In a machine of the character specified, a movable box-carrying member, a rack movable across said box-carrying member, internal and external segment gears mounted on said box-carrying member and adapted to actuate said rack, tape-clamping devices mounted on said rack, pins adapted to actuate said clamping means, tape-severing means, and a cam on said box-carrying member adapted to actuate said severing means.

15. In a machine of the character specified, a rotary box-carrying member, a rack movable across said member, internal and external gears mounted on said box-carrying member, connections between said gears and said rack, tape-clamping means on said rack, pins adapted to open and close said clamping means, tape-cutting devices, and a cam on said box-carrying member adapted to actuate said tape-cutting devices.

16. In a machine of the character specified, a rotary box-carrying member, a rack movable across said member, internal and external segment gears mounted on said member, a pinion in mesh with said rack, a pinion in operative relation with said segment gears, connections between said pinions, tape-clamping means on said rack, pins adapted to open and close said clamping means, tape-cutting means, a cam on said box-carrying member adapted to actuate said cutting devices, said clamping means being opened and said cutting devices being actuated simultaneously.

In testimony whereof we affix our signatures.

FORREST C. SIMON.
JOHN F. O'BRIEN.

Copies of this patent may be obtained for five cents each, by addressing the "Commissioner of Patents, Washington, D. C."